United States Patent [19]
Peterson et al.

[11] 3,713,927
[45] Jan. 30, 1973

[54] THERMOSETTABLE SHEET MOLDING COMPOUND AND METHOD OF MAKING

[75] Inventors: Frank C. Peterson; Leslie P. Theard, both of Pittsburgh, Pa.

[73] Assignee: Gulf Oil Corporation, Pittsburgh, Pa.

[22] Filed: June 11, 1971

[21] Appl. No.: 152,376

[52] U.S. Cl. ............................................... 156/62.6
[51] Int. Cl. ................................................. B29j 5/00
[58] Field of Search ............................. 156/62.6, 62

[56] References Cited

UNITED STATES PATENTS 2,906,317  9/1959  Keyes ................................. 156/62.6

Primary Examiner—Norman G. Torchin
Assistant Examiner—John L. Goodrow
Attorney—Meyer Neishloss et al.

[57] ABSTRACT

A resin-fiber glass mixture is sprayed-up and partially cured to a flexible, non-tacky sheet molding compound for second stage curing to a solid, infusible resin in a heated mold. The mixture is sprayed-up into a relatively flat sheet of one layer or two or more separable layers or with a variable thickness, if desired, to conform to the profile of the part to be molded. The resin comprises a polyanhydride, such as the copolymer of maleic anhydride and an alpha-olefin, an olefinically unsaturated monooxirane compound such as glycidyl methacrylate, and an olefin such as styrene.

17 Claims, No Drawings

THERMOSETTABLE SHEET MOLDING COMPOUND AND METHOD OF MAKING

This invention relates to a flexible, non-tacky, partially-cured sheet molding compound comprising a resin-fiber glass composition which is formed by a spray-up technique. The sheet molding compound can be formed as a layered sheet which can be separated into two or more sheets for separate second-stage curing in a mold. The resin composition in this sheet molding compound is formed from a solution of a polyanhydride, such as the copolymer of maleic anhydride and an alpha-olefin, an olefinically unsaturated monooxirane compound such as glycidyl methacrylate, and a monoolefin capable of polymerization by free radical means such as styrene. Following spray-up, the resin-fiber glass mixture is soft and sticky. It must be partially polymerized in a first stage to form the sheet molding compound which can be easily handled and can be easily separated into thinner sheets for mold curing in a second stage.

In the first stage the olefinic double bonds of the olefinically unsaturated components are interreacted to produce a linear polymer homogeneously intermixed with the polyanhydride of the initial composition and with unreacted olefinically unsaturated components, if any, without significant reaction of the anhydride and epoxy groups. In the second stage, the anhydride groups and the epoxy groups of the intermediate product are caused to link together at an elevated temperature to form a hard, infusible resin. Unreacted olefinic double bonds from the first stage, if any, are also reacted together in the second stage.

Sheet molding compound (SMC), a designation of the Society of the Plastics Industry, is a resin-fiber glass reinforced, thermosetting composition in sheet form which is designed for compression molding in matching molds. Polyester materials have generally been used as the resin component but epoxy formulations have also seen some use. This sheet molding compound is generally formed in a continuous process by depositing dry, chopped glass fiber roving between resin-coated plastic film, such as polyethylene film. The sandwich is then roller kneaded and compacted to uniformly disperse the resin throughout the glass fiber and to accomplish uniform thickness. The maximum thickness that is practicable with this method is about one-eighth inch because of the difficulty of obtaining a uniform resin dispersion in the fiber glass by kneading thicker sandwiches and also due, in part, to the increased tendency of the resin to escape from the edges of thicker sandwiches in the kneading process. This plastic contained, sticky mixture is usually wound up in roll form and thickened at about 100° F. The resulting sheet molding compound can then be cut to the desired mold shape and molded after removal of the plastic film covering.

Reinforced plastic products can also be formed in a different procedure by spraying or blowing a resin-fiber mixture onto a form. This technique is known in the art as the spray-up method for producing reinforced plastics. In this method a catalyzed resin in liquid form, preferably unfilled polyester resin, and chopped fiber glass roving are sprayed or blown simultaneously onto a form, such as a boat hull, until the desired thickness has been obtained. Partial wetting of the glass fibers is obtained in flight and more complete wetting, as well as compaction and uniform distribution of the resin in the fiber, is obtained on the form by rolling out the sprayed-up material before the resin hardens. Polyester resin with little or no filler is necessary for this spray-up procedure because the viscosity of filled polyester resin is so high that satisfactory spray-up is not practicable.

We have unexpectedly discovered that sheet molding compound can be made by the spray-up method. As part of our discovery, we have surprisingly found that sheet molding compound of high uniformity and quality can be readily and conveniently made in thicknesses much greater than one-eighth of an inch and that our invention is adapted to benefit from the many advantages or resin formulations having a high filler content. Thus, with our invention sheet molding compound can be conveniently made in thicknesses of one-half inch and more and with a filler content, including fiber glass, of 50 weight percent or more with appropriate resin formulations. We have also discovered that the sheet molding compound produced by this spray-up method with first stage partial curing can be produced in the form of physically distinct layers which can be separated or peeled apart for second-stage curing in a heated mold to a solid, infusible resin. Thus, this novel sprayed-up sheet molding compound is an intermediate product leading up to the mold cured, solid, infusible product.

This sheet molding compound, having separable layers and a thickness heretofore unobtainable in sheet molding compound, is uniquely adapted for and significantly simplifies commercial distribution and utilization of sheet molding compound. In producing a final molded product from sheet molding compound, the manufacturer desires a sheet molding compound which rather precisely matches the thickness of his molded product. This means that a series of sheet molding compounds differing only in thickness is desired for different products of different thicknesses. Such a series is not available, but even if it were, its utilization would produce scheduling, inventory and related administrative and operational problems in sheet molding compound operations. In the absence of such a series of sheet molding compound of different thicknesses, molders are obligated to buy the conventionally available 1/16-inch thick sheet molding compound and stack two or more layers for products requiring greater thickness at a significant increase in labor and expense and a possible internal weakness at the layer boundary.

However, by means of the present invention these problems are reduced or eliminated because the separable, layered sheet molding compound of the present invention can be produced in only one thickness for commercial use. Since our sheet molding compound can be made in a thickness much greater than currently commercially available as well as be formed in separable layers, it can be made as thick as the greatest thickness required for any part so that the molder can use it directly, or he can peel off or otherwise separate one or more layers of the desired thickness from the sheet molding compound for his specific molding requirements. Alternatively, the sheet molding compound can be made up in an intermediate thickness and peeled apart for thinner parts or two or more separate sheets can be laid together for a thicker part.

The molded part formed from sheet molding compound can have a variable thickness or profile, which might result from a flange, boss, and the like forming an integral part of the molded product. This requires different amounts of the resin-fiber glass mixture in different parts of the mold. It is preferred that at least about 80 percent of the material that is required for a molded part be located in the mold in the general proximity where it is needed. Sheet molding compound can be built up with smaller pieces to generally conform to the thickness requirements of the mold. This technique is costly in terms of time and labor. We have discovered that a contoured sheet molding compound substantially conforming to the variations in thickness of the part to be molded can be directly produced by our spray-up technique, thereby avoiding the inconvenience and expense of manual buildup of the sheet molding compound.

We have discovered that the sheet molding compound of this invention can be made by the spray-up method from a resin composition comprising a polyanhydride, such as the copolymer of maleic anhydride and an alpha-olefin, an olefinically unsaturated monooxirane compound such as glycidyl methacrylate, and optionally a monoolefin capable of polymerization by free radical means such as styrene. Since the sprayed-up mixture is soft and sticky, it is contained within two plastic film surface layers such as polyethylene. The resin formulation of this mixture must be partially cured so that the plastic film can be easily removed and the resin-fiber glass mixture can be easily handled.

The first-stage partial cure through the olefinic double bonds is accomplished by a suitable free radical initiating means, which does not cause significant anhydride-epoxide reaction, such as suitable chemical initiators, ionizing radiation, ultraviolet radiation and the like. After this partial cure, the sheet molding compound is flexible and non-tacky. The plastic film can be removed and the sheet molding compound can be cut, shaped, separated into two or more sheets and cured under pressure in a second-stage to a solid, infusible resin using heated matching molds. When the first stage, partial cure is accomplished by ionizing radiation, it is preferred that the resin formulation also contain an olefinically unsaturated monoanhydride such as maleic anhydride to lower the dosage rating required for the initial cure.

We have discovered that when the particular resin formulation described herein is sprayed-up, a substantially complete in-flight wetting of all fibers is obtained, thereby avoiding a need to intermix the fibers and resin by kneading. We have further discovered that this resin formulation can be highly loaded with filler material for modification of its properties and reduction in its cost and still be sprayed-up with good in-flight wetting of all fibers and good lay-down of material.

In spraying-up this resin-fiber glass formulation any suitable spray-up equipment can be used which concurrently blows or sprays the resin and chopped fiber glass together, with good in-flight wetting, onto a layer of plastic backing film. The plastic film can suitably be polyethylene, polyvinyl chloride, polyvinylidene chloride, a polyamide, and the like. Polyethylene film is preferred because of availability and low cost. Spray-up may desirably be onto the plastic film in a horizontal plane, however, this is not essential since satisfactory spray-up can be undertaken onto a substantially non-horizontal surface, including a non-planar surface.

The operator with experience can spray a good pattern and produce layers of the resin-fiber glass mixture having a substantially uniform thickness. A suitable spray-up procedure utilizes a portable, hand-operated spray-up gun. The spray-up gun is aimed at one corner of a rectangular plastic backing film and is moved slowly to an adjacent corner to form a good even band of deposited material. The motion of the spray gun is then reversed in direction with a small advance towards the opposite edge of the plastic film to form a second band of deposited material overlapping the first band. This reciprocating motion of the spray gun with progressive deposition of material is repeated until the plastic film is completely coated and one layer has been sprayed-up. This procedure is repeated to produce the second layer and each successive layer until the desired number of layers and desired total thickness are obtained. A second plastic backing film is placed on the top layer. Each sequentially formed layer which is sprayed-up in this general manner can be separated from the adjacent layer or layers after the sprayed-up material is partially cured through the olefinically double bonds to form the sheet molding compound as described.

Generally each sprayed-up layer will have a thickness of at least about one thirty-second inch with the maximum layer thickness being a matter of choice although about one-eighth inch is generally the maximum layer thickness that is obtained in conventional spray-up. The final sheet molding compound can be formed with one, two or a plurality of layers with an overall thickness that is suitable for the particular circumstances. As a result of the particular properties of the resin mixture used herein when applied in the spray-up preparation of sheet molding compound, a good lay-down of the resin-fiber glass mixture is obtained with good fiber wetting without necessitating kneading of the sprayed-up material. Since excellent in-flight wetting of the fibers is obtained and the need for kneading of the sprayed-up material is thereby eliminated, the final thickness of the sheet molding compound is no longer restricted by a kneading requirement. If the layered, sprayed-up material were subjected to kneading as required in conventional spray-up methods, the layers would be intermingled and could not therefore be separated after first-stage curing to form the sheet molding compound.

The sprayed-up resin-fiber glass mixture can be first stage cured by ionizing radiation under conditions which do not lead to significant epoxide-anhydride reaction. In order to accomplish this the temperature of the mixture is kept relatively low, below 70° C. and preferably below 50° C. However, if some epoxide-anhydride reaction can be tolerated, temperatures somewhat above 70° C. for a limited period can be tolerated.

Polymerization of the olefinic double bonds of the olefinically unsaturated components can be readily carried out by ionizing radiation at a dosage as low as less than 1 megarad up to about 30 megarads or higher without significant epoxide-anhydride reaction.

When the initial partial cure of the sprayed-up resin is obtained by means of a suitable chemical free radical initiator, the initiator is incorporated into the resin formulation prior to or concurrently with spray-up. Suitable chemical free radical initiators together with their accelerator or activator include benzoyl peroxide with N,N-dimethyl aniline, benzoyl peroxide with N,N-dimethyl-p-toluidine, methyl ethyl ketone peroxide with cobalt naphthenate, and the like. When these chemical free radical initiators are used, the sheet molding compound is maintained at moderate temperatures, preferably below 70° C., to prevent significant anhydride-epoxide cross-linking.

The partially cured sheet molding compound is flexible and non-tacky. It can be handled, cut, shaped and molded after the plastic film has been removed. Furthermore, it has retained its layered nature, the layers corresponding to the layers formed in the spray-up operation. Although these layers are visibly indistinct, they can easily be separated by peeling or stripping them apart. For example, if the sheet molding compound is 12 layers thick and the particular molding operation requires a sheet molding compound one-half the thickness of the 12 layered material, then it can be peeled into two halves, each six layers thick. On the other hand if the molding operation requires a sheet molding compound one-third the thickness of the 12 layered material, it is peeled apart into thirds, each third being four layers thick. This layered sprayed-up sheet molding compound possesses great utility and convenience. Of further significance is the fact that although this layered sheet molding compound possesses layers coinciding with the sprayed-up layers permitting ready separation at the boundaries of the layers, these layers are thoroughly intermingled and lose all identity when the material is second-stage cured in pressure molds to the solid, infusible resin. This means that the final product does not possess an internal weakness at the former layer boundaries.

The handling and molding characteristics of this sheet molding compound are a function of the raw materials used, their relative proportions, the curing temperature, the amount of olefinic polymerization, the amount of anhydride-epoxide polymerization and the like. Thus it is seen that significant control of the properties and characteristics of the sheet molding compound can be effected by means of these variables.

A useful, non-tacky sheet molding compound which is suitable for second-stage mold curing is obtained when the olefinic double bonds are only partially polymerized. This intermediate product will contain unreacted olefinically unsaturated monomer homogeneously intermixed with the polymer chains. It can be stored for several days up to several weeks prior to the second stage curing depending, in part, on the amount of the olefinic double bonds that have been reacted, the volatility of the unreacted components and the temperature at which the material is stored.

This novel procedure for making sheet molding compound is particularly useful in the preparation of sheets of partially cured resin-fiber glass mixtures for second stage curing in matching molds to fully cured products of close tolerance and of intricate shapes, i.e., nonplanar and/or of varying thickness, such as auto body parts and the like. When subjected to molding pressure and temperature, the partially polymerized fiber glass-resin mixture readily flows into intricate mold sections and conforms to the mold prior to polymerization to the hard, rigid product. This polymerized product does not stick to the mold walls and is readily ejected from the mold by conventional means.

The sheet molding compound in which the olefinic groups are more completely copolymerized is more rigid than the product containing only partially copolymerized olefinic groups and is still moldable but cannot flow or conform to intricate molds to the same extent as the product containing the partially polymerized double bonds. The anhydride-epoxide reaction is very slow at room temperature, therefore, a substantially fully olefinically cured sheet molding compound can be stored for long periods of time awaiting second stage curing. In order to aid moldability of these substantially fully olefinically cured sheet molding compounds they can be initially compounded with a suitable amount of a non-reactive or a reactive component which imparts a plasticizing quality to the resin. Significant polymerization of the anhydride and epoxide groups in the first-stage cure can undesirably increase the rigidity of the sheet molding compound and can tend to interfere with mold curing.

The preferred polyanhydride, which is used in conjunction with the olefinically unsaturated monooxirane compound and the monoolefin capable of polymerization by free radical means, is prepared by the copolymerization of maleic anhydride and its derivatives with alpha-olefins. The polyanhydride is a solid mixture of polymerized molecules of different chain lengths which can be represented by the general formula:

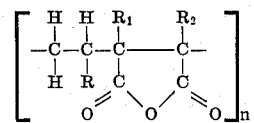

wherein $n$ is between 2 and about 500, preferably between about 2 and about 200, R is hydrogen, halogen or a straight chain alkyl or halogenated alkyl group, having from one to about 18 carbon atoms, and $R_1$ and $R_2$ are independently selected from hydrogen, halogen, alkyl having from one to four carbon atoms and phenyl. Additional useful polyanhydrides are encompassed in the definition of U.S. Pat. No. 3,441,543 at column 2, line 64 to column 8, line 53, which is incorporated herein by reference as a part of this disclosure. The polyanhydride molecules terminate with hydrogen or with relatively small molecular fragments of the type conventional in free radical polymerization, such as fragments of the chain transfer agent, the solvent, the chain terminating agent, and the like.

Examples of olefin compounds or mixtures of olefins which are preferred to form the solid polyanhydride components of the compositions of this invention include: ethylene, 1-propene, 1-butene, 1-pentene, 1-hexene, 1-heptene, 1-octene, 1-nonene, 1-decene, 5-chlorohexene-1, 1-undecene, 1-dodecene, 1-tridecene, 1-tetradecene, 1-octadecene, and mixtures thereof, and the like.

Examples of maleic anhydride derivatives which are preferred to form the solid polyanhydride components of the invention include: maleic anhydride itself, chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride, and the like.

The solid polyanhydride is made by the copolymerization of the olefin compound and the maleic anhydride derivative. The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-alpha-olefin to maleic anhydride is desirably between about 1:1 and 3:1. The preparation of this solid polyanhydride and the conditions for its preparation are set out in said U.S. Pat. No. 3,441,543.

As the olefinically unsaturated monooxirane compound, we prefer to use glycidyl acrylate or glycidyl methacrylate. Other useful monooxiranes are disclosed in U.S. Pat. No. 3,441,543 at column 9, line 39 to column 11, line 75, which is incorporated herein by reference as a part of this disclosure.

The compositions also preferably comprise an olefinically unsaturated monomeric compound free of oxirane oxygen atoms and containing as its only functional group at least one olefinic double bond capable of polymerization by free radical means. Olefinically unsaturated monomeric compounds which polymerize by a free radical mechanism are well known in the art and are generally alpha-olefinically unsaturated compounds which contain substituents directly connected to the beta-carbon atom of the alpha-olefin, which substituents activate the alpha-olefin double bond for polymerization by effecting a net electron withdrawal from the olefinic double bond. Electron withdrawal groups are well known in the art and include halogen, aromatic radical, nitrile, and the like, as disclosed in U.S. Pat. No. 3,441,543 at column 12, lines 1 to 61 and column 13, line 49 to column 15, line 65 which is incorporated herein by reference as a part of the disclosure.

Examples of preferred olefinically unsaturated compounds defined above include styrene, acrylonitrile, methyl methacrylate, vinylidene chloride, acrolein, p-chloro- and p-bromostyrene, butadiene, vinyl acetate, vinyl bromide, vinyl chloride, and the like, and mixtures of these.

The olefinically unsaturated monooxirane compound and the olefinically unsaturated monomer free of oxirane oxygen atoms preferably must have reactivity ratios of 1 or less for superior results. If a reactivity ratio is greater than 1, the olefinically unsaturated monomer preferentially reacts with itself. When the reactivity ratio is 1, the monomer shows no preference in its reaction partner. When the reactivity ratios are less than 1, each olefinically unsaturated monomer prefers to react with the other type of monomer. Thus, in the case of a mixture of glycidyl methacrylate and styrene the reactivity ratios are less than 1, therefore, the resulting copolymer comprises randomly distributed glycidyl methacrylate and styrene molecules on each chain.

This three-component resin formulation comprising the solid polyanhydride, the olefinically unsaturated monooxirane compound and the olefinically unsaturated monomeric compound can be used in the spray-up gun in combination with a suitable chemical free radical initiator for partial curing through the olefinic groups after spray-up. This formulation is also suitable for use when the sheet molding compound is partially cured after spray-up through the olefinic groups by suitable ionizing radiation. However, as previously indicated, we prefer that the formulation contain a suitable olefinically unsaturated monoanhydride to permit radiation partial cure at a lower dosage rating.

We prefer maleic anhydride as the olefinically unsaturated monoanhydride for the liquid resin composition. Also useful are derivatives of maleic anhydride including chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride, and the like.

In general, it is preferred that the polyanhydride, the olefinically unsaturated monooxirane compound, the olefinically unsaturated monoanhydride, when present, and the olefinically unsaturated monomeric compound form a liquid solution below 70° C. and more preferably at about room temperature in order to obtain a final, cross-linked resin which is homogenous and grain-free. Since the polyanhydride and maleic anhydride are solids at room temperature, it is necessary that at least one of the other olefinically unsaturated compounds be liquid at room temperature in order to dissolve the other components and it is preferred that both of the other olefinically unsaturated compounds be liquid at room temperature. Additionally, the liquids must be mutually soluble and capable of solubilizing the solid anhydride.

As indicated, the relative proportions of the three primary constituents, that is, the polyanhydride, the olefinically unsaturated monooxirane compound and the olefinically unsaturated monomeric compound affect the properties as well as the handling and molding characteristics of the intermediate, olefin-polymerized product, that is, the sheet molding compound. These relative proportions can also have a significant effect on the properties of this finally, cured cross-linked product as well as the overall cost. In general, the molar ratio of the polyanhydride to monoepoxide compound that can be employed in the compositions varies over a fairly wide range. Since the polyanhydride is a mixture of molecules of different sizes and numbers of anhydride groups, the anhydride to epoxide equivalent ratio, i.e., the A/E ratio, is used to express the relative proportions of anhydride and epoxide groups present in the liquid resin composition. The A/E ratio of 1 mol of maleic anhydride and 1 mol of glycidyl methacrylate is 1.0. In the compositions described herein the A/E ratio can suitably be between about 0.1:1 and 5:1, but is preferably between 0.3:1 and 2:1 and more preferably between about 0.5:1 and 1.5:1.

As described, an olefinically unsaturated monoanhydride can be incorporated into the resin formulation. In this instance the above-defined ranges for the A/E ratio remain the same. The incorporation of the olefinically unsaturated monoanhydride into the resin mixture reduces the radiation dosage required for a suitable sheet molding compound. With other things remaining constant and within the composition limits specified herein, the radiation dosage required for a suitable sheet molding compound is reduced as the amount of the olefinically unsaturated monoanhydride is increased and can be lowered to 1 megarad or less with appropriate control of conditions and composition. The olefinically unsaturated monoanhydride can suitably comprise up to about 90 percent of the total anhydride equivalents present and preferably about 20 to about 80 percent when it is used in the liquid resin composition.

The amount of the olefinically unsaturated monomer with no epoxide or anhydride functionality can vary between 0 and about 85 percent by weight of the liquid resin composition and preferably between about 30 and about 75 percent of the liquid resin composition. The maximum amount of any particular unsaturated monomer to employ will depend upon its compatibility in the final product, that is, the intersolubility of the components. Thus it has been found that the lower the A/E ratio when using glycidyl methacrylate, the greater the amount of styrene that can be used.

Polymerization of the double bond is highly exothermic (20–22 K.Cal./Mol). Furthermore, since irradiation is a heating process, it adds further to the internal heat in the material under treatment when used. In view of this, care must be exercised in order that the sheet molding compound does not heat high enough in the first stage polymerization to cause a significant anhydride-epoxide cross-linking reaction such that it cannot be easily handled, separated into thinner sheets, or molded. When the fiber glass-resin mixture has been sprayed-up in thin sheets, the exothermic heat of reaction is more readily dissipated than when thick sheets are formed, therefore, greater care must be exercised in partially curing the thicker sheets. It is because of this exothermic heat of reaction that it is preferred to initiate the first stage reaction with the materials at about room temperature or lower. Furthermore, the rate of the first stage reaction and therefore the heat buildup can be partially controlled by decreasing the intensity of the ionizing radiation and increasing the radiation time to obtain the required radiation dosage, when radiation is used.

If the sheet molding compound is used soon after it is made, such as within 1 to several days, it can be temporarily stored for use without problem. However, if only partial copolymerization of the olefinic components is carried out in the first stage, substantial polymerization of the unreacted olefin compounds can take place on prolonged storage such as to affect the subsequent ability to flow and conform to the mold. Thus when the olefinic constituents are substantially completely polymerized in the first stage or prolonged storage is contemplated, it may be desirable to incorporate in the initial mixture a plasticizer or a plasticizing monomer, which possesses the ability to enhance the flow characteristics during molding. Such plasticizing components include epoxidized vegetable oils such as epoxidized soy bean oil, di-2-ethylhexyl phthalate, dioctyl phthalate, dihexyl phthalate, di-isooctyl phthalate, polyethylene glycols such as those having a molecular weight between 600 and 1,000, nadic methyl anhydride, phenyl glycidyl ether, alkyl glycidyl ethers such as octyl and decyl glycidyl ethers and the like.

Refrigeration of the sheet molding compound will reduce polymerization during storage. Generally when the first stage polymerization is carried out as part of an integrated operation, the molding operation is carried out relatively soon in an adjacent unit. In this instance holding time presents no problem. However, when the first stage product is distributed in the channels of commerce, stability over periods of weeks or months may be required. In this instance the use of a plasticizer or a plasticizing monomer can be useful or a suitable inhibitor can be used to prolong shelf life.

The curing of the sheet molding compound accomplishes a cross-linking of the polyanhydride chains and the polyepoxide chains through the anhydride and epoxide functions. This curing is obtained at elevated temperatures. The curing temperature has been found to be critical in order to obtain finally cured resins which have suitable physical properties. Curing temperatures are therefore suitably between about 180° F. and about 400° F., preferably between about 240° F. and about 350° F. For quick cures it is most preferred to use a curing temperature toward the upper end of the range. The curing time is generally between about 30 seconds and about 8 hours depending on the curing temperature, the resin composition and the like. Curing in stages, that is, at different temperatures, can be utilized, however, for simplicity and convenience one stage curing is preferred. Although pressure is not required for the second stage curing, it is usually involved when the sheet molding compound is mold cured and fortuitously the physical properties of the finally cured product are improved by curing under pressure. Pressures as high as 5,000 p.s.i. and higher are usable herein.

The fiber reinforcement is preferably fiber glass produced by chopping fiber glass roving into suitable lengths, using a chopper associated with the spray gun, such as from ⅛ to 2 inches, preferably at least ¼ inch in length. Other suitable fibrous material can be used as the reinforcement for the resin in the sheet molding compound. These alternative materials include fibers made from minerals including natural glasses, basalt slags and the like, natural fibers such as jute, cotton and the like, synthetically produced organic fiber such as nylon, polyester and the like, and metallic threads which can be cut and sprayed in a spray-up gun.

Fiber glass roving is well known and commercially available for spray-up. A lubricant or finish is generally applied to the fiber glass filaments by the manufacturer. It is preferred that the fiber glass filaments comprising the roving have a coating or finish which is reactive under the curing conditions with at least one of the resin-forming components. The silane finishes are preferred because they are chemically bonded to the glass filaments and have free reactive groups available for reaction with the resin.

The resin compositions can contain constituents in addition to the monomers and core material such as pigments or dyes for coloring the finished product, plasticizers as mentioned, fillers and the like. The fillers provide the desirable function of reducing the cost of the final product without significantly reducing the physical properties. Suitable filler material includes powdered calcium carbonate, clay, sands, powdered metals such as aluminum and iron, metal oxides such as iron oxide, aluminas, etc., powdered silica, wood flour, walnut shell flour and the like. The filler is preferably inert in the composition, that is, it should not react with any of the reactants or catalyze a reaction involving the reactants and should be fine enough to be sprayed without clogging the gun nozzle and should be used in an amount that will not thicken the resin formulation to an extent that satisfactory spray-up is not possible. Other additives which can be used are a suitable mold release agent or a material such as poly(methyl methacrylate) or finely ground polyethylene to impart a low profile, that is, a smooth surface, to the finally cured product.

The following examples are set out to illustrate the novel features of the invention and to provide a better understanding of their details and advantages.

We have found that a polyanhydride prepared from maleic anhydride and an alpha-olefin such as hexene-1 is highly suitable herein. We have also found glycidyl methacrylate to be very suitable as the unsaturated monooxirane compound, maleic anhydride as the olefinically unsaturated monoanhydride and styrene as the unsaturated hydrocarbon. The polyanhydride is a solid at room temperature and is soluble in the glycidyl methacrylate and a glycidyl methacrylate-styrene solution but not styrene alone. Therefore, we find it convenient to mix the polyanhydride in a glycidyl methacrylate-styrene solution. The maleic anhydride is also a solid but presents no special solubility problem.

The polyanhydride that was used in the following examples was prepared by reacting 1-hexene and maleic anhydride in a molar ratio of about 2:1 in the liquid phase. The reaction was carried out in the presence of a mutual solvent at a temperature between 60° and 100° C. using as a catalyst between 2 and 3 weight percent benzoyl peroxide based on the maleic anhydride. The copolymer was separated from the solvent and any residual catalyst and then dried. Infrared and nuclear magnetic resonance analysis showed that the hexene and maleic anhydride combined in a 1:1 molar ratio.

An electron beam linear accelerator was used as the source of the ionizing radiation. An 8 MEV electron beam was produced in a single wave guide, single section, linear accelerator at a pulse repetition rate of 180 pulses per second. The beam was directed vertically downward onto a horizontal rotating table at a dose rate of approximately 1 megarad per minute.

EXAMPLE 1

A mixture containing 2,400 grams of the 1-hexene-maleic anhydride copolymer described above, 1,728 cc. of glycidyl methacrylate and 3,120 cc. of styrene was prepared. The mixture was stirred for 45 minutes at room temperature until the polyanhydride was fully dissolved. To this solution 6,912 cc. of styrene and 653 grams of maleic anhydride were added with stirring and stirring was continued for 15 minutes until solution was obtained. This was followed by the addition of 438 cc. of carbon tetrachloride and 280.5 grams of an internal mold release agent. Next, 748 grams of finely ground asbestos particles were added with stirring as a low shrink and surface improving additive and 16,973 grams of powdered calcium carbonate filler were added with stirring. The resulting mixture was a readily flowable liquid, creamy in consistency. The resin comprised 17.3 weight percent polyanhydride, 4.7 percent maleic anhydride, 12.4 percent glycidyl methacrylate and 65.6 percent styrene.

This liquid mixture was sprayed-up onto a horizontally flat, 25 square-foot film of polyethylene using a Poly-Gun with roving cutter, a portable spray-up system obtained from Glas-Craft of California of Sun Valley, Calif. This spray-up gun was under the manual control of the spray-up operator. The resin was pumped to the single nozzle of this spray-up gun and was projected to the target by compressed air supplied to the gun. The glass roving cutter dropped 1-inch chopped glass fibers into the resin spray. The liquid mixture and the chopped fiber glass were fed in an amount to form a final product containing 25 percent fiber glass with the remainder being 32 percent resin and 43 percent filler.

Spray-up was started with the spray-up pattern directed to one corner of the polyethylene backing sheet and the spray-up pattern was caused to move to an adjacent corner, thereby coating the polyethylene sheet with a band of the resin-fiber glass mixture along one edge. The spray-up pattern was reversed in direction and advanced somewhat towards the opposite edge of the polyethylene sheet to form a second band of the resin-fiber glass mixture slightly overlapping the first band. This reciprocating motion of the pattern with advance was repeated until the polyethylene sheet was completely covered with the resin-fiber glass mixture forming the first layer. Excellent fiber wetting and lay-down of material were obtained. This operation was repeated and the second layer was sprayed-up. In the same manner a total of 12 layers were sprayed-up to form a sheet three-eighths of an inch thick. A second protective film of polyethylene was placed on the upper surface of the soft, sticky material. Since there was excellent wetting of the fibers and good lay-down of the material, no compaction or kneading was required. It was cut into 1-foot squares for irradiation.

A series of the 1-foot squares were placed at room temperature, in sequence, on the rotating irradiation table and irradiated with a dose of 9 megarads. The product sheet molding compound was warm to the touch and after cooling was solid-like, non-tacky, and was easily shapable by hand. The sprayed-up layers could easily be separated and peeled apart starting at an edge or corner. The squares were refrigerated at 40° F. for 12 hours and then a number of samples with the polyethylene films removed, some of which were obtained by peeling apart the sheet molding compound into thinner sheets, were pressure molded in a cup mold (ASTM D731–57) at about 320° F. for 10 minutes at a pressure of about 4,000 p.s.i. The resulting molded cups were rigid, hard and smooth and possessed good physical properties.

EXAMPLE 2

Another portion of the sheet molding compound prepared in Example 1 was stored for three weeks at 40° F. These samples could also be easily peeled or separated into the layers corresponding to the sprayed-up layers. These samples were then molded in the same cup mold for 10 minutes at 320° F. and about 4,000 p.s.i. and demonstrated good moldability. The resulting molded cup possessed excellent surface qualities and physical properties.

EXAMPLE 3

Example 1 was duplicated except that the rate of feed of the chopped glass roving and the resin formulation were varied so that a resin-fiber glass composition containing 40 percent fiber glass and the remainder being resin with filler was sprayed-up. Excellent in-flight wetting of the glass fibers was obtained and the resin-fiber glass mixture laid down well. No kneading or compaction was required. After irradiation, the sheet molding compound was stored for 24 hours. It easily separated by peeling into thinner layers corresponding to the sprayed-up layers. It molded well at the conditions described in Example 1 to a solid product having good properties.

The fiber glass is added to give strength to the finally cured product, the more glass the stronger it is, provided that there is enough resin to properly wet the glass. Also the product is increased in strength by the use of longer glass fibers. There can be from about 10 weight percent of glass up to 90 percent glass (with no filler) with a preferred range of glass content of about 15 to 50 percent. The filler can be present in an amount of 0 percent up to about 60 percent or more, preferably at least 10 percent, and most preferably about 25 to about 50 percent with fiber glass present in its preferred range. Since there is a maximum as to the total solids, that is, fiber glass plus filler, that can be incorporated into the product, the filler content and the fiber glass content must be balanced for desired properties especially with a formulation using maximum solids. It is generally preferred to use a formulation substantially fully loaded with solids.

Any suitable mold release agent can be used, as required. An internal mold release agent such as zinc stearate can be incorporated into the resin formulation in suitable amounts. Many suitable compositions are commercially available. Or alternatively, a suitable mold release agent can be used on the molds. After the molds have been broken in by use, we have experienced little difficulty in the formulations sticking to the molds in the second-stage molding.

A number of different formulations were sprayed-up in the manner as described in the above examples. In every case excellent in-flight wetting of the fibers was obtained together with a good lay-down of the resin-fiber glass mixture. Kneading or compaction of the sprayed-up mixture is not required, however, we found that it may be practicable to smooth out unevenness in the upper surface of the sprayed-up sheet and reduce any voids or vapor spaces in the sandwich by limited compaction, which is minor in contrast with the vigorous kneading required in the prior art sheet molding compound, described above in which dry glass fibers are deposited onto resin coated plastic film. This limited compaction does not destroy the integrity of the layers making up the sheet. Limited compaction may not be practicable with sprayed-up mixtures of variable thickness. In a number of cases experimental variations in the first stage cure to produce the sheet molding compound resulted in an unsatisfactory product, due to an undercure or an overcure, which was not useful as a sheet molding compound. In every case where a satisfactory sheet molding compound was obtained and which was sprayed-up in layers as described, the sheet molding compound could be separated into its component layers. No deficiency was noted in the finally cured product attributable to the layered nature of the sheet molding compound.

The operator of the spray-up gun can readily learn the technique of spraying-up each layer at an even, predetermined thickness without breaks as well as learn how to spray-up sheets of variable thickness. The spray-up pattern described herein is not critical but is merely illustrative of a satisfactory method for carrying out good spray-up. Although we have emphasized the spraying-up of a series of layers, it is also possible for the operator to spray-up one layer of substantial but constant thickness. Also, with experience the operator can spray-up a sheet of variable thickness which is adapted to substantially conform in thickness to an intended molded product of variable thickness, such as one containing integral ribs or bosses, to provide the material in the mold proximate to where it is needed and to substantially reduce the flow of material in the mold.

The spray-up can be onto a stationary film as described herein or it can be carried out in a continuous process in which a slowly moving web of plastic film passes under one or a series of spray guns each of which sprays-up a separate layer onto the moving plastic film to produce a sheet having one or more layers corresponding to each spray gun. Each of these spray guns can be manually operated, but it is preferred that they be mounted, in series when more than one spray gun is used, for mechanical reciprocation above the moving plastic film in a direction transverse of the direction of the plastic film. In this manner each pattern of resin-plastic mixture that is sprayed-up onto the moving plastic film reciprocates back and forth across the plastic film to sequentially form layer upon layer. After the final layer is sprayed-up, it can be covered with a second plastic film and the continuous web of material cut up into sheets, rolls or otherwise handled in an appropriate manner and then partially cured through the olefinic linkages to form the sheet molding compound. In a modified procedure the continuous web of material is partially cured before it is cut into individual sheets. When this procedure is followed, it may be convenient to omit the second plastic film. This is particularly useful when the sheet molding compound is by intention of variable thickness.

This continuous spray-up technique is also particularly adapted for automated production. In this approach, the entire operation can be programmed and the equipment controlled by the program. For example, the bottom plastic film can be fed at a rate, variable if desired, in accordance with the program. The rate of reciprocation of the spray gun or guns and/or deposition of the resin-glass mixture can be varied in controlled coordination with the film feed to produce a spray-up pattern varying in regional thickness to provide for ribs, bosses and the like in molded products of variable thickness. The ionizing radiation equipment, if used, as well as the cut-off control can in like manner be controlled by the program in a total coordinated, automated operation. This automated operation would be of particular benefit in association with a large volume, mass production operation such as is involved in the automotive industry.

It is to be understood that the above disclosure is by way of specific example and that numerous modifications and variations are available to those of ordinary skill in the art without departing from the true spirit and scope of our invention.

We claim:

1. A method of preparing a sheet molding compound which comprises forming a liquid resin solution of a polyanhydride containing at least two succinic anhydride groups and less than three conjugated double bonds when one of the conjugated double bonds is between the carbon atoms alpha to the carbonyl groups in a succinic anhydride group;

an olefinically unsaturated monooxirane compound containing as its only functional groups a single oxirane oxygen atom and an olefinic double bond capable of being polymerized by free radical means; optionally an olefinically unsaturated monomer free of oxirane oxygen atoms and containing as its only functional groups at least one olefinic double bond capable of polymerization by free radical means; and optionally an olefinically unsaturated monoanhydride having an olefinic double bond capable of polymerization by free radical means;

spraying-up said resin solution together with strands of fiber with in-flight wetting of said fiber strands onto a surface to form at least one layer of a mixture of said resin solution and said fiber strands; and polymerizing at least a portion of said olefinic double bonds of said olefinically unsaturated monooxirane compound and said olefinically unsaturated monomer by free radical means without substantial polymerization of the anhydride groups and the epoxide groups present in the mixture whereby a homogeneous mixture of polyanhydride molecules, polyepoxide molecules and any unreacted olefinically unsaturated compound is obtained.

2. A method in accordance with claim 1 in which said surface is a first plastic film and a second plastic film is placed on the sprayed-up mixture of resin solution and fiber strands prior to said polymerization step.

3. A handleable, thermosettable sheet molding compound prepared by the method of claim 2.

4. A method in accordance with claim 1 in which at least two layers of said mixture of said solution and said fiber strands are sequentially sprayed-up, the first layer being sprayed-up onto said surface, and each succeeding layer being sprayed-up onto the immediately preceding layer.

5. A handleable, thermosettable sheet molding compound having separable layers prepared by the method of claim 4.

6. The method of preparing a solid, infusible resin which comprises separating at least one layer of said sheet molding compound of claim 5, and heating said separated layer in a mold at an elevated temperature.

7. A method in accordance with claim 1 in which the polyanhydride is represented by the general formula $$\left[ \begin{array}{c} H\ H\ R_1\ \ \ \ \ R_2 \\ -C-C-C-\!\!\!-\!\!\!-\!\!\!-C- \\ H\ R\ \underset{O}{C}\ \ \ \underset{O}{\diagdown}\ \underset{O}{\diagup}\ \underset{O}{C} \end{array} \right]_n$$

wherein $n$ is between 2 and about 500, R is hydrogen, halogen or a straight chain alkyl or halogenated alkyl group having from one to 18 carbon atoms, and $R_1$ and $R_2$ are independently selected from hydrogen, halogen, alkyl having from one to four carbon atoms and phenyl.

8. A method in accordance with claim 7 in which R is a straight chain alkyl group, $R_1$ and $R_2$ are hydrogen, said olefinically unsaturated monooxirane compound is glycidyl acrylate or glycidyl methacrylate, said olefinically unsaturated monomer is styrene, and said fiber strands are fiber glass strands.

9. A handleable, thermosettable sheet molding compound prepared by the method of claim 8.

10. A method in accordance with claim 1 in which said free radical means comprises a chemical free radical initiator incorporated in said liquid solution.

11. A method in accordance with claim 1 in which said olefinically unsaturated monoanhydride is maleic anhydride and said free radical means comprises ionizing radiation.

12. A method in accordance with claim 1 in which said solution and strands of fiber are sprayed-up to form a sheet of variable thickness.

13. A non-tacky, thermosetting sheet molding compound of variable thickness produced by the method of claim 12.

14. A method in accordance with claim 1 in which said resin solution comprises from about 10 percent to about 60 percent of an inert filler based on the total resin-fiber mixture.

15. A non-tacky, thermosetting sheet molding compound produced by the method of claim 14.

16. A non-tacky, thermosetting sheet molding compound produced by the method of claim 14 comprising from about 15 to about 50 percent fiber glass and from about 25 to about 50 percent inert filler.

17. A handleable, thermosettable sheet molding compound prepared by the method of claim 1.

* * * * *